United States Patent [19]
Kaess

[11] 3,876,547
[45] Apr. 8, 1975

[54] BUTTERFLY CONVEYOR CLIP FOR FLAT BED FILTER

[75] Inventor: Frank R. Kaess, Oneida, N.Y.

[73] Assignee: Clarkson Industries, Inc., New York, N.Y.

[22] Filed: Aug. 1, 1973

[21] Appl. No.: 384,424

[52] U.S. Cl. .............. 210/387; 198/195; 210/401
[51] Int. Cl. ............................................ B01d 33/32
[58] Field of Search .......... 198/189, 194, 193, 195, 198/196; 210/232, 251, 387, 401, 406

[56] References Cited
UNITED STATES PATENTS

| | | | |
|---|---|---|---|
| 2,621,779 | 12/1952 | Harter | 198/194 |
| 3,045,809 | 7/1962 | Bechtel, Jr. | 198/195 |
| 3,087,620 | 4/1963 | Hirs | 210/387 X |
| 3,333,705 | 8/1967 | Lee | 210/251 |
| 3,468,424 | 9/1969 | Laugel | 210/401 |
| 3,477,583 | 11/1969 | Krynski et al. | 210/401 |
| 3,483,978 | 12/1969 | Kracklauer | 210/232 X |
| 3,706,200 | 12/1972 | Mueller | 198/189 X |

Primary Examiner—Samih N. Zaharna
Assistant Examiner—Robert H. Spitzer
Attorney, Agent, or Firm—Curtis, Morris & Safford

[57] ABSTRACT

A filter of the type having a movable perforate conveyor formed of a series of transverse bars and interconnecting links includes a filter medium supported on the top surface of the conveyor for movement therewith in a housing which cooperates with the conveyor and filter medium to form a pool of liquid to be filtered on the filter medium. Fixed sealing strips are located on opposite sides of the pool and bear against side edge portions of the filter medium to inhibit flow of liquid from the sides of the pool and means operatively connected to the perforate conveyor support the portions of the filter medium passing under the sealing strips. This supporting means comprises a series of clips, each of which has an upper surface substantially coplanar with the top surface of the conveyor and downwardly extending tab means for removably securing the clips to the conveyor.

18 Claims, 7 Drawing Figures

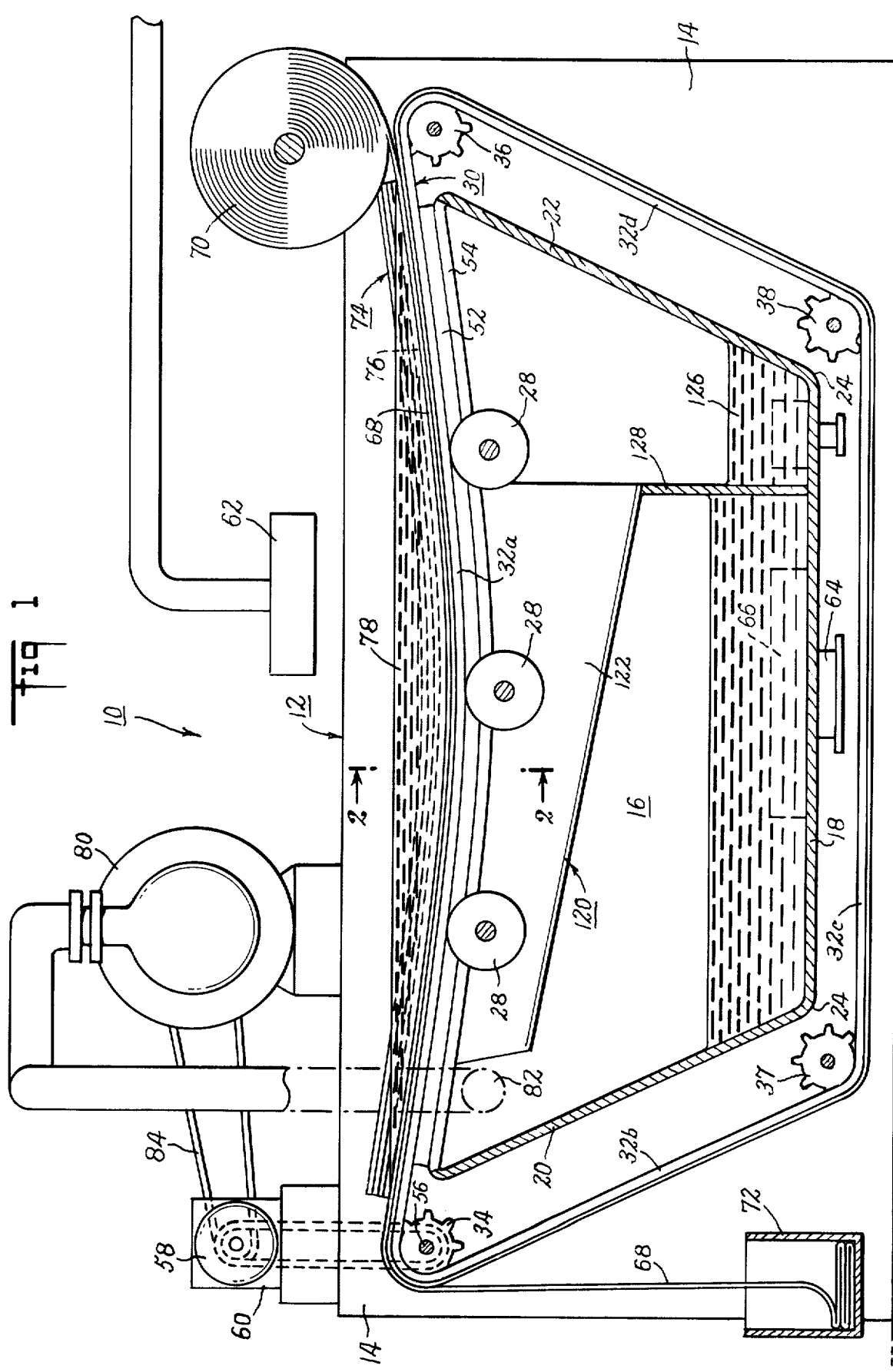

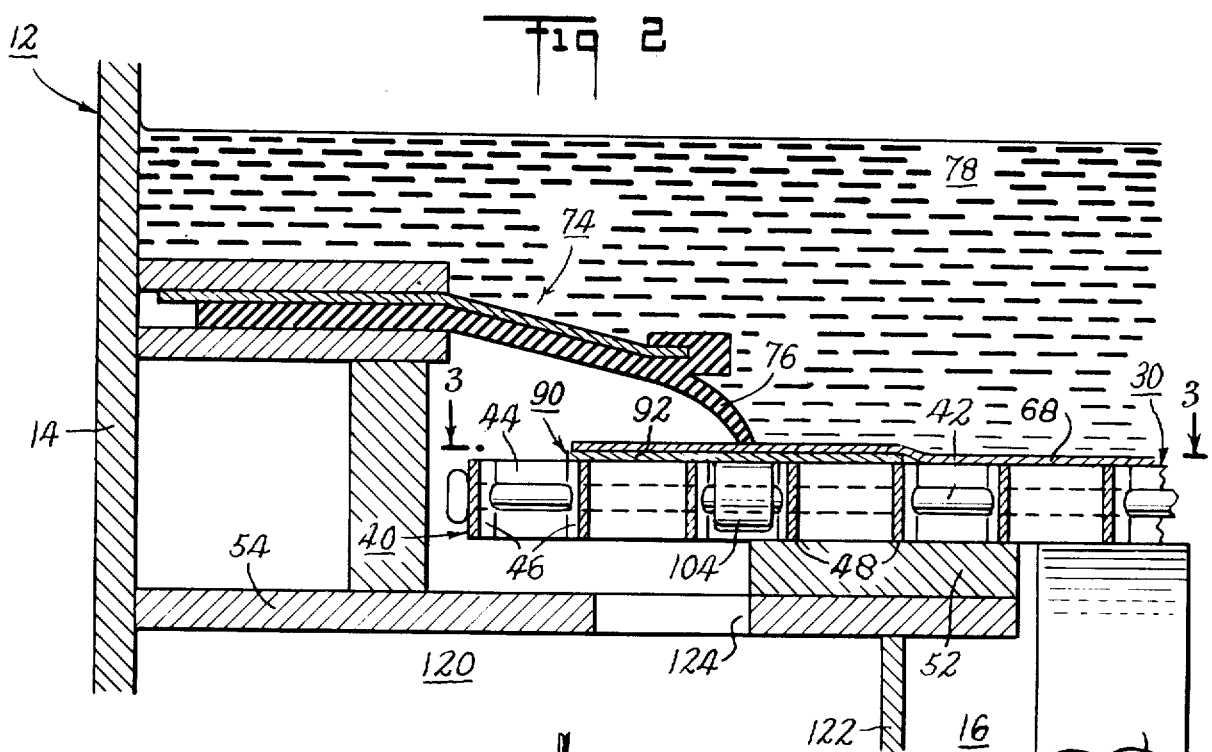
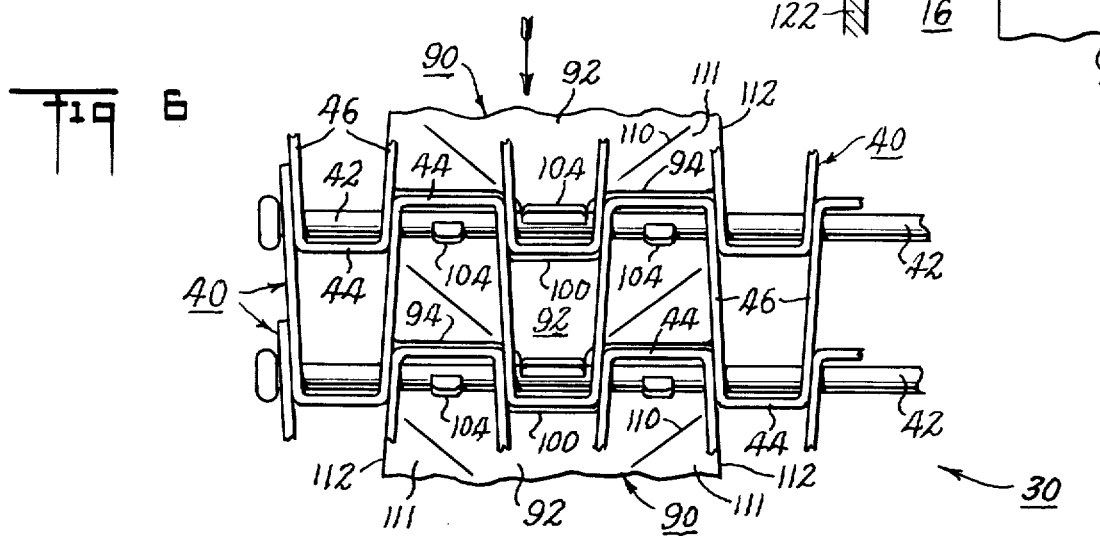
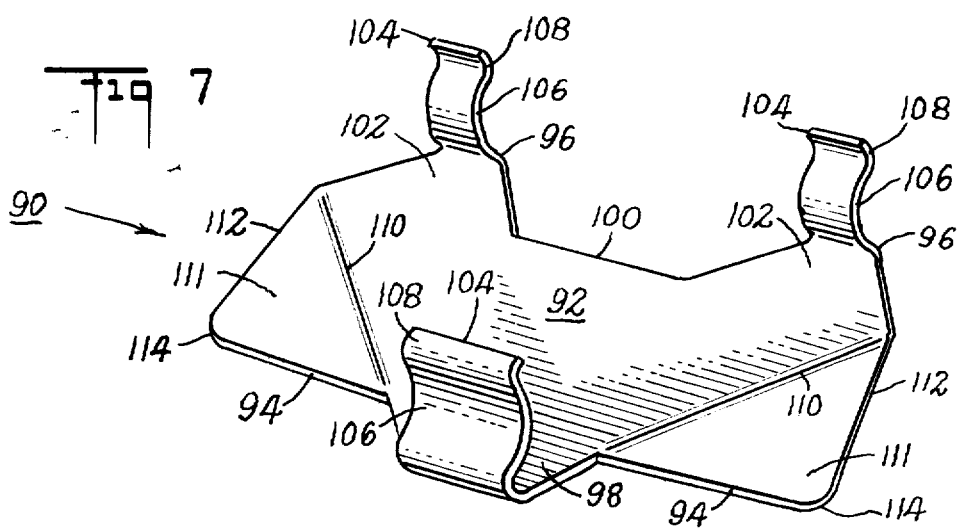

BUTTERFLY CONVEYOR CLIP FOR FLAT BED FILTER

This invention relates generally to filter devices and more particularly to clip members that are resiliently attachable to and detachable from a perforate conveyor for use in connection with the side sealing means of flat bed filters such as that shown in U.S. Pat. No. 3,333,705 issued to W. J. Lee.

Flat bed filters commonly comprise an endless conveyor, the upper reach of which carries a strip of filter medium such as paper or cloth. The conveyor and filter medium cooperate with the sides of the filter tank to define a trough adapted to contain a pool of the liquid to be filtered. The conveyor is periodically advanced to carry fresh filter medium into one end of the pool and remove filter medium carrying a layer of the filtered solids from the other end of the pool.

In order to minimize leakage of unfiltered liquid in such filters, sealing means are provided on each side of the pool. One conventional type of seal is that shown in the Lee Patent, U.S. Pat. No. 3,333,705 referred to above, the disclosure of which is incorporated herein by reference. In that type of seal, the side edge portions of the conveyor have strips of impervious material, e.g., rubber, attached to the upper surface of the conveyor, with the side edges of the filter medium extending thereover. A flexible resilient sealing member is cantilever mounted on each side wall of the tank above the conveyor and has a sealing rib that bears downwardly against the portion of the strip of filter medium that overlies the strip of rubber at the edge of the conveyor. The sealing ribs thus cooperate with the rubber strips to minimize the leakage or seepage of unfiltered liquid at the sides of the pool.

While such seals have been found to be generally satisfactory, after the filter has been in service for a time there is a tendency for the rubber strip to become detached from the conveyor particularly at those points where the conveyor passes over the sprockets on which it is supported since at those points the conveyor changes its direction of movement rather abruptly and creates stresses in the bond between the conveyor and rubber strip which tend to rupture the adhesion therebetween.

Accordingly, it is an object of the invention to provide an improved means of sealing the side edges of the filter medium of a flat bed filter. It is another object of the invention to provide sealing strips at the side edges of such a conveyor that support the filter medium and mechanically engage the conveyor to minimize the possibility of the strips becoming detached from the conveyor. It is still another object of the invention to provide side sealing strips for such a conveyor which comprises a series of interpenetrating metal clips that are resiliently attachable to and detachable from the upper surface of the conveyor. It is also an object of the invention to provide a clip or clips that are resiliently engageable with and detachable from a perforate conveyor comprising links interconnected by transverse bars, and that are adapted to block off predetermined areas of the conveyor.

It is noted that although the present invention is described herein in connection primarily with a filter of the type shown in U.S. Pat. No. 3,333,705, as the description proceeds it will become apparent that the conveyor clips of the present invention are generally applicable for blocking predetermined areas of conveyors of general utility which have transverse bars interconnected by links.

The above and other objects, features and advantages of the invention can best be understood and appreciated by reference to the following detailed description of the invention and to the accompanying drawings which illustrate a preferred embodiment thereof, wherein:

FIG. 1 is a semi-diagrammatic side elevational view of a flat bed filter, constructed in accordance with the present invention and shown in section to illustrate the arrangement of the endless conveyor around a sump tank and the relationship of the filter medium to the conveyor;

FIG. 2 is a partial vertical section, taken along line 2—2 of FIG. 1, showing the general relationship between the edge of the conveyor, the clips, the filter medium and the cantilever mounted sealing rib;

FIG. 6 is a fragmentary bottom plan view of the conveyor, further showing the relationship of the clips to the conveyor; and FIG. 7 is a bottom perspective view of one of the clips.

Figure 3:
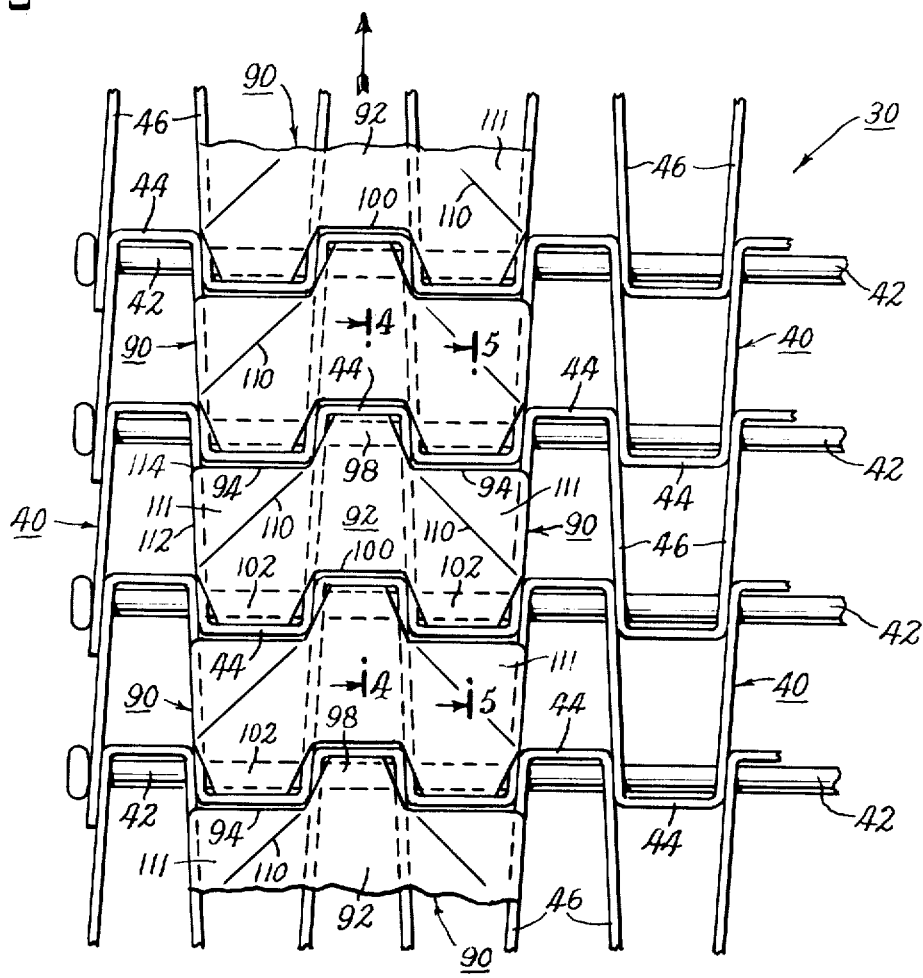
FIG. 3 is a top plan view, taken along line 3—3 of FIG. 2, of an edge portion of the conveyor showing a group of clips affixed thereto.

Referring now to the drawing in detail, and initially to FIG. 1 thereof, it will be seen that a flat bed filter 10 incorporating the present invention, and constructed in a manner similar to that of the flat bed filter shown in the above-mentioned Lee patent, includes a frame 12 having side walls 14 (only one of which is seen in FIGS. 1 and 2) connected by a plurality of transversely extending plates which are welded together to form a sump tank 16. These plates include a bottom wall member 18 and a pair of inclined end walls 20, 22 which are welded together at their points of juncture 24 to form a waterproof container with the side walls 14.

The top of sump tank 16 is covered by a supporting bed 26 through which liquid can drain into the sump tank. The supporting bed, as described in the Lee patent, generally comprises a plurality of inverted channels (not shown) arranged in spaced relation, with each channel having a pair of depending side flanges on which rollers 28 are mounted at spaced points along the filter to support a conveyor belt 30 laterally and longitudinally on the bed.

Conveyor 30 is an endless closed loop conveyor mounted on the frame in a predetermined position so as to move about sump tank 16. The conveyor has a top run of flight 32a which extends between sprockets 34, 36 and rides on the downwardly curved supporting bed 26. A section 32b of the conveyor 30 extends downwardly from sprocket 34 adjacent the end wall 20 of the sump 16 and around a sprocket 37 at the lower left hand end of the tank. From sprocket 37 the conveyor 30 has a horizontal return section 32c under tank 16 which then turns around sprocket 38, and an end section 32d extending upwardly between sprockets 38 and 36 adjacent the end wall 22 of the sump tank.

As seen most clearly in FIGS. 3 and 6, conveyor 30 is formed from a plurality of generally zig-zag shaped transversely extending links 40 which are interconnected in a generally overlapped or intermeshing relationship by transversely extending pivot bars 42. The zig-zag links 40 are formed or bent in a series of oppositely extending generally U-shaped link sections each of which has bight portions 44 and leg portions 46 extending therefrom. The transverse bars 42 pivotally interconnect the links through the legs 46 at locations adjacent bight portions 44, with the bight portions of the links received between the spaced bight portions in an adjacent link. In this manner the links are slightly overlapped with one another, but form a relatively flat and continuous top surface on the conveyor belt.

The connected links and transverse bars thus provide a chain type conveyor, the edges of which are adapted to ride over and be engaged with the sprockets 34–38. The transverse bars 42 give the conveyor substantial transverse strength; however, the edges 48 of the conveyor are supported, at least along the top run 32a thereof, by a dam plate 52 (more fully described hereinafter) which is supported on an inwardly extending ledge 54 secured to the side walls 14 of the filter frame. It is noted that only one dam plate and one side edge 48 of the conveyor are shown in FIG. 2; however, the opposite side edge and support construction is identical thereto.

The various drive and support sprockets 34–38 for conveyor 30 consist of a plurality of individual sprockets (e.g., between four and sixteen) mounted on common shafts extending between opposite sides of the filter frame, with the sprockets 34 providing the drive power to the conveyor. Thus, the sprockets 34 are each mounted on a common shaft 56 which is driven by a motor 58 through a conventional chain and sprocket drive transmission 60. The use of a plurality of sprockets extending across the width of the conveyor supports the conveyor at each corner and prevents it from sagging in the middle of its width. As described in the Lee patent, the drive to the conveyor is controlled by an adjustable vacuum switch which is subjected to the vacuum in the sump tank 16 and is connected to operate motor 58 to start and stop the conveyor at certain low pressure differentials.

A liquid distributor 62 is located above the top surface of conveyor 30 and directly above sump tank 16 for delivering the liquid to be filtered into the filter unit. On the other hand, a discharge pipe 64, depending from a box 66 projecting laterally through the side plate 14 of the sump tank provides a conduit for discharge of filtrate from the sump tank to the location at which the filtrate is used; thereby to form a completed circuit with distributor 62 for circulating the liquid filtrate from the filter unit to the workpiece and then back to the filter unit.

A filter medium 68, in the form of a sheet of paper or cloth, is provided or supplied in a roll 70 which is rotatably mounted at the right hand end of the machine. The filter sheet extends from the roll 70 onto and in engagement with the conveyor 30 and is advanced therewith by the motor 58. More particularly, as seen in FIG. 1, filter sheet 68 extends along the curved top of the conveyor 30, in its path of travel over supporting bed 26, with the forward end of the filter medium and filter cake thereon being discharged into a receptacle 72.

Sealing strips 74 (see FIG. 2) formed of a flexible material are secured to the side plates 14 of the filter frame with their inner edges 76 overlying the side edges of the filter medium 68 to form a seal between the side wall 14 and the filter medium. As a result, the downwardly curved supporting bed 26 and the filter sheet 68 supported thereon by conveyor 30 forms a pool 78 of liquid to be filtered which can only escape by passing through the filter medium itself into the sump tank 22 or by seepate through the side sealing strips 74.

In operation, a vacuum pump 80, having an inlet 82 connected to sump 16 and driven from motor 58 by a chain drive 84, draws air from sump 16 to reduce the pressure therein and cause the liquid to be filtered to be forced through the filter medium under atmospheric pressure, thereby to filter the liquid and cause the same to enter the sump.

As thus far described, the flat bed filter 10 is of substantially the same construction as that of the filter described in the above-identified Lee patent. As mentioned, in the filter disclosed in that patent seepage through the sealing strips 74 is prevented by the provision of an impervious rubber sealing strip secured to the conveyor surface. This type of sealing arrangement creates several problems in that the rubber seal tends to become disengaged from the conveyor chain, particularly where the chain moves about the sprockets. In accordance with the present invention, an improved seal construction is provided wherein the sealing operation of the previously proposed rubber strips is performed by independent clip members 90 which are secured to the conveyor 30 adjacent the edges thereof so as to move below the sealing strips 74. These clips are mechanically connected to the chain and form a substantially continuous support surface beneath the strip 74, thereby serving substantially the same function as the previously described rubber strips, but overcoming the problems of the latter since the clips remain at all times secured to the conveyor and are not subject to attack by the liquid to be filtered.

As seen most clearly in FIG. 3 of the drawing the conveyor 30 is provided with a series of clips 90 (also referred to hereinafter as butterfly clips) which have a configuration which is selected to generally conform to the configuration of the zig-zag shaped links of the conveyor. Each clip is independently operatively connected between adjacent pairs of transverse conveyor bars 42 and substantially completely covers the conveyor between successive links.

The construction of each clip 90 is identical and a typical clip is illustrated from below in FIG. 7 of the drawings wherein it is seen that the clip includes a main body portion 92 having a forward edge 94 and a trailing edge 96. The forward edge of the clip has a projection or tongue 98 extending therefrom, while the railing edge 96 has a recess 100 formed therein. As a result, the trailing edge 96 is provided with a pair of projections or tongues 102 which extend oppositely of the projection 98. The location and dimensions of the projections 98, 102 are selected so as to be received within the general peripheral configuration of the U-shaped portions of the zig-zag links, as seen in plan in FIG. 3. Thus, these projections give the clip its generally butterfly configuration, with the central projection or tongue 98 at the leading edge of the clip received within one U-shaped portion of its associated zig-zag link 40 (i.e., the link whose perforations or openings it covers) and the other two projections 102, being received within the adjacent two U-shaped portions of the link. In addition, the tongue 98 and recess 100 of the clip are generally complementary, so that the tongue of one clip can fit into the recess of an adjacent clip when the clips are placed on the conveyor in a row, as seen in FIG. 3. In this manner a substantially continuous surface is provided along the perforate conveyor in order to support the filter sheet 68 beneath the continuous sealing strip 74. The main body portions 92 of the clips thereby form a support surface for the sealing strips.

Figure 4:
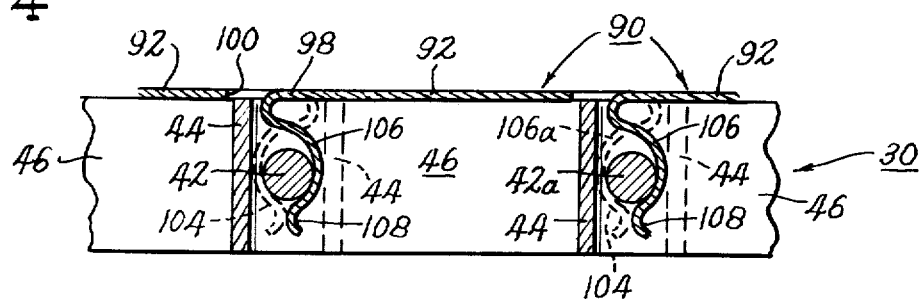
FIG. 4 is a fragmentary section taken on the line 4—4 of FIG. 3 showing in part the manner in which the clips are attached to the conveyor.
Figure 5:
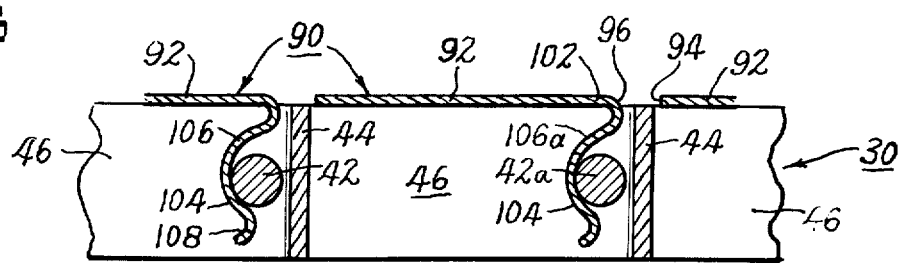
FIG. 5 is a fragmentary section taken on the line 5—5 of FIG. 3 and further showing the mode of attachment of the clips.

Clips 90 are secured to conveyor 30 by a plurality of tabs or extensions 104 which extend downwardly from the projections 98, 102. These tabs 104 have oppositely curved re-entrant surfaces 106, as seen in FIG. 7, so as to receive confronting surfaces of adjacent transverse conveyor bars 42. That is, as seen in FIGS. 4 and 5 of the drawing, the forward tab 104 on tongue 98 receives an adjacent bar 42 in its curved surface 106 while, on the other hand, the two tabs 104 along trailing edge 96 of clip 90 (as seen in dotted lines in FIG. 4 and solid lines in FIG. 5) receive the next conveyor bar 42a in their curved re-entrant surfaces 106a on the side thereof which faces the preceeding conveyor bar 42. Thus, the clip is in effect wedged between successive conveyor bars by the resilient tab members 104, with the tab on the tongue or one clip engaging the same transverse bar as the tabs on the projections 102 of an adjacent clip.

It is noted that clips 90 are preferably formed of a resilient metal material such as stainless steel or the like; however, it is contemplated that the clips may be formed of any other convenient resilient materials which would be suitable for use in a filter conveyor.

The resiliency of the material forming clips 90 holds the clips in engagement between the successive bars 42 and yet permits the clips to be readily removed therefrom for replacement and readily inserted therebetween. In this connection, it is noted that the free ends 108 of the tabs 104 are oppositely curved from the curvature of their adjacent re-entrant surface portions 106. In this manner, the extensions 108 act as cam members for the tabs when the clips are inserted between adjacent bars 42. That is, the first portions of the tabs which engage the bars 42 upon insertion of the clips are the extensions 108. These extensions thereby act to cam the tabs inwardly, i.e., towards the center of the clip, when a downward force is applied to the clip so as to guide the tabs 104 into position about bars 42. Once the tabs 108 have passed bars 42, the tabs spring outwardly again against the bars to resilient hold the clip on the conveyor.

It is noted that the particular shape of the clips 90 shown in FIGS. 3-7 of the drawings is important where a conveyor having zig-zag links of the type illustrated in the drawings is utilized. The configuration is selected to substantially completely cover the adjacent portions of the conveyor, on which the clip is superimposed, but does not interfere with movement of the conveyor, particularly about the sprockets. For example, if a clip having a square configuration were utilized, so that the body of the clips overlapped adjacent links, upon pivotal movement of an adjacent link with respect to the clip, as the conveyor goes about a sprocket, the adjacent link would move against the clip and tend to release that clip from engagement with its associated conveyor bar. That is, considering FIG. 4 of the drawing, if a square type clip were utilized in lieu of the butterfly shaped clip of the present invention (i.e., if the clip did not have recess 100 formed therein but had a straight rear edge 96) the clip would overlap the bight portion 44 of the next link in the conveyor (i.e., the bight portion immediately adjacent the tongue 98 of the next clip 90). In that case, when the link to which the clip 90 is connected begins to move about a sprocket, the link would pivot with respect to the succeeding link, causing the bight portion 44 of the next link to engage the lower surface of the clip. Such engagement of the bight portion 44 of the succeeding link with the clip would cause the clip to become disengaged from the transverse bar 42. This is avoided by the construction of the present invention wherein the butterfly shape is selected so as to keep the clip within the confines of its own link and wherein the clip is dimensioned so that its width between leading edge 94 and trailing edge 96 is less than the width of the zig-zag link. Accordingly, the clip does not overlap any portions of any adjacent link, does not interfere with pivotal movement of the conveyor about the sprockets, and does not become disengaged from the sprockets because of the angular movement of the links with respect to one another as they pass about the curved path of travel or about a sprocket.

Another feature of the invention is that the main body portion 92 of clips 90 is bent slightly along angular lines 110 adjacent the leading edge 94 of the clip. That is, the shoulder portions or triangular sections 111 defined by lines 110 and leading edge 94 on opposite sides of tongue 98 are bent slightly downwardly about the line 110, so that the edges 112 of the clip bear firmly against the top surface of the conveyor 30. By bending the triangular portions 111 of the clip in this manner, the clip remains substantially coplanar or flush with the top surface of the conveyor so as to insure that the corners 114 thereof do not inadvertently extend above the top surface of the conveyor to interfere with the filter medium 68 or to otherwise interfere with the operation of the device.

As a result of the construction of clips 90, a substantially continuous band is formed on conveyor 30 where rib 76 of strip 74 engages the filter medium. Accordingly, seepage or other migration of unfiltered liquid from the pool 78 through the sealing strips 74 is reduced to a minimum. Moreover, the resilient strip is supported on the conveyor surface and cannot enter the perforations in the conveyor itself. Of course, it will be understood that the construction at the opposite side of the filter and conveyor 30 is identical with that described above and includes sealing strip 74 and a series of clips 90 secured to the conveyor.

Filter 10 of the present invention also includes a pair of troughs located at opposite edges of the conveyor 30, which troughs are of similar construction to the troughs described in the above-mentioned Lee patent. Only one of the troughs 120 is illustrated in FIG. 2 of the drawings and it is to be understood that the trough at the opposite edge of conveyor 30 is of identical construction. Essentially, trough 120 is formed from a horizontal wall (not shown) extending inwardly from the side wall 14 and a vertical wall 122 connecting the inner edge of the lower horizontal wall to the underside of the ledge 54. The latter has openings 124 formed therein so that any unfiltered liquid passing beneath sealing strips 74 may move laterally along the top of the filter medium around the side edge of conveyor 30 and drip onto the ledge 54. Such liquid will then flow through the openings 124 in the ledge, fall into the trough 120 and be prevented from entering the tank 16. As described in the Lee patent, the trough supplies the unfiltered liquid flowing thereinto a sump 126 formed in sump 16 and separated from the filtered liquid by a wall 128.

The flat bed filter described above operates in substantially the same manner as the filter disclosed and described in the Lee patent discussed above. Therefore, a detailed description of the operation of the device is not necessary herein. It will be appreciated, however, that the clips 90 of the present invention, used in combination with the zig-zag linked conveyor serve substantially the same purpose as the rubber ribs of the Lee filter in providing a support for the edge 76 of sealing strip 74 below the filter medium. These clips are highly advantageous in the present invention since they are directly secured to the transverse conveyor bars and will not separate therefrom during movement of the conveyor into a curved path or around the respective sprockets. Moreover, neither the clips nor their connection to the conveyor are subject to attack by the liquid to be filtered. Therefore, the clips and conveyors will have a relatively long and useful life. Further, in the event that any one or more of the clips becomes worn or broken, that clip can be readily removed and replaced by a new clip while the conveyor remains in the filter. Thus, the replacement of the clips results in no substantial "down time" for the filter since they eliminate the necessity of completely removing the conveyor from the filter for repair as would be the case with the Lee device. Accordingly, it is seen that highly advantageous conveyor clips have been provided which are not only relatively simply constructed and inexpensive but which also improve the operation and operating life of flat bed filters.

Although an illustrative embodiment of the present invention has been described herein with reference to the accompanying drawing, it is to be understood that the invention is not limited to that precise embodiment and that various changes and modifications may be effected therein by one skilled in the art without departing from the scope or spirit of this invention.

What is claimed is:

1. In a filter of the type having a movable perforate conveyor comprising a series of transverse bars and links interconnecting said bars, a sheet of filter medium supported on the top surface of said conveyor for movement therewith, means cooperating with said conveyor and filter medium for forming a pool of liquid to be filtered on said filter medium, and means comprising fixed sealing strips on opposite sides of said pool bearing against side edge portions of said filter medium for inhibiting flow of liquid from the sides of said pool, the improvement which comprises means operatively connected to said perforate conveyor for providing a substantially continuous support surface for supporting the portions of said filter medium passing under said sealing strips, said supporting means comprising a series of clips each of which has an upper surface substantially coplanar with the top surface of said conveyor and resilient tab means for removably securing the clip to the conveyor; said tab means comprising downwardly extending curved extensions of said clips resiliently engaging said transverse bars of said conveyor; said clips having first and second opposite side edges of predetermined generally complementary configuration including projections having free end portions extending over their adjacent transverse conveyor bars, thereby to form said substantially continuous support surface with adjacent clips; said tab means extending downwardly from the free end portions of said projections to positions below and beneath the projections for resilient engagement with their associated transverse conveyor bars.

2. A filter according to claim 1 wherein said clips each include at least two downwardly extending curved extensions located in opposite sides of the clip for respective engagement with adjacent bars of said conveyor.

3. A filter according to claim 2 wherein said downwardly extending curved extensions on said clips respectively engage confronting surfaces of adjacent bars of said conveyor.

4. A filter according to claim 3 wherein said clips are respectively secured to said conveyor between successive pairs of transverse conveyor bars in substantially longitudinal alignment with each other to form a continuous row of clips along the conveyor.

5. A filter according to claim 4 wherein the curved extensions on adjacent sides of successive clips in said row of clips engage opposite sides of the same transverse conveyor bar.

6. A filter according to claim 1 wherein said projections on said clips comprise a projecting tongue extending from one of said edges and a pair of spaced projecting tongues extending from the other of said edges and defining a recess therebetween of generally complimentary configuration to the projecting tongue on said one of said edges; said clips being secured to said conveyor by said tab means with the tongue on said one edge of each of said clips extending into the recess on the other edge of its associated adjacent clip, thereby to form a substantially continuous support surface.

7. A filter according to claim 6 wherein each of said clips includes at least three of said downwardly extending tab means formed thereon, one of said tab means being formed integrally with and depending from the free end of the tongue on said one edge of the clip and the other two of said tab means being formed integrally with and depending from the free ends of the projecting tongues on the other edge of the clip adjacent said recess, said tab means respectively comprising resilient curved extensions of the clips located below and beneath their associated projecting tongues for resiliently engaging the bars of said conveyor.

8. A filter as defined in claim 7 wherein said downwardly extending tab means are formed to resiliently engage confronting surfaces of adjacent transverse conveyor bars.

9. A filter as defined in claim 8 wherein said tab means have re-entrant curved surfaces formed thereon with the curved surfaces on the tabs at opposite side edges of said clips opening in opposite directions to engage the confronting surfaces of adjacent transverse conveyor bars.

10. A filter as defined in claim 8 wherein said tabs each have an inclined free edge portion defining a cam surface for guiding its associated tab into resilient mating engagement with its associated transverse conveyor bar.

11. A filter as defined in claim 7 wherein said tongue on said one edge of each of said clips, and said one edge thereof, define shoulder portions in said clips adjacent said one edge thereof, said shoulder portions of said clips being bent slightly downwardly towards said conveyor to insure that substantially all portions of said clips remain substantially coplanar with the top surface of said conveyor during movement thereof.

12. A filter according to claim 7 wherein the width of said clips between said first and second side edges is less than the width of said conveyor links, whereby said clips permit free pivotal movement of said links about said transverse bars through a curved path of travel.

13. A filter according to claim 7 wherein said links have a generally zig-zag configuration including a plurality of integrally formed and oppositely extending generally U-shaped members, with said links being slightly overlapped with respect to adjacent links whereby the bight portions of said U-shaped members extend between the legs of the U-shaped members of adjacent links, said clips having a width dimension between said first and second side edges which is less than the distance between bight portions of successive links, whereby said clips permit free pivotal movement of said links about said transverse bars through a curved path of travel, while said projecting tongues extend over their adjacent transverse bars to positions adjacent the edges of an adjacent clip thereby to form said substantially continuous support surface.

14. A filter comprising a frame, a perforate endless conveyor supported in said frame to form a pool of liquid supplied to the top thereof, means for moving said conveyor in said frame, a sheet of filtering medium positioned on and supported by said conveyor for movement therewith and sealing means having resilient strips extending from opposite sides of said frame and engaging the sheet of filter medium adjacent to and inwardly from its opposite side edges to retain the liquid to be filtered in said pool; said conveyor comprising a series of transverse conveyor bars and a plurality of "zig-zag" shaped links respectively pivotally connected between adjacent pairs of bars, said "zig-zag" shaped links each extending transversely of the path of travel of the conveyor and being formed of a plurality of generally U-shaped link sections alternately opening in opposite directions and pivotally connected adjacent their bight portions to said transverse conveyor bars whereby said links are partially overlapped with the bight portions thereof positioned between leg portions of adjacent links; and a plurality of removably mounted clips members secured to said conveyor in generally longitudinal alignment with each other for providing a substantially continuous support surface for supporting the portions of said filter material passing under said sealing strips, each of said clip members comprising a relatively flat main body portion for covering portions of an associated link, said main body portion having first and second opposite edge portions, said first edge portion including a projection extending outwardly therefrom and a pair of adjacent shoulders on opposite sides of said projection, said projection including a free end portion extending over its adjacent transverse conveyor bar, said second edge portion having a pair of spaced projections extending outwardly therefrom and defining a recess therebetween of generally complementary configuration to the projection on said first edge portion; said pair of projections having free end portions extending over their adjacent transverse conveyor bar, said projections on said clip each including tab means extending downwardly from the free end portions thereof to positions below and beneath their associated projections and located adjacent independent bight portions of its associated link for removably securing the clip to said adjacent transverse conveyor bars; with the projection on said one side received in the recess of the other side of an adjacent clip, thereby to form a substantially continuous support surface with adjacent clips.

15. The filter as defined in claim 14 wherein said tabs are formed to engage confronting surfaces of their associated transverse conveyor bars.

16. The filter as defined in claim 15 wherein said tab means each have re-entrant curved surfaces formed thereon with the curved surfaces on the tabs at opposite side edges of said clips opening in opposite directions to engage the confronting surfaces of adjacent transverse conveyor bars.

17. The filter as defined in claim 14 wherein said clips are secured to said conveyor in predetermined locations with respect to one another, with the projections on said one side of said clips being received in the recesses formed on said second side of adjacent clips, thereby to form a substantially continuous support surface for the filter medium.

18. The filter as defined in claim 14 wherein said clips have a predetermined peripheral configuration selected to cover only portions of its associated links thereby to permit free pivotal movement of said links about said transverse bars through a curved path of travel.

* * * * *